United States Patent [19]

Davey

[11] Patent Number: 4,473,533
[45] Date of Patent: Sep. 25, 1984

[54] FREE FLOATING CHLORINE CONTROLLING ASSEMBLY

[76] Inventor: Wayne C. Davey, 7317 Jaboneria Rd., Bell Gardens, Calif. 90201

[21] Appl. No.: 415,566

[22] Filed: Sep. 7, 1982

[51] Int. Cl.³ .......................................... B01D 11/00
[52] U.S. Cl. .................................. 422/265; 422/277; 210/169; 222/190
[58] Field of Search ........................... 4/86, 227, 228; 210/169; 222/189, 190, 463; 441/1, 6, 21; 422/37, 265, 277

[56] References Cited

U.S. PATENT DOCUMENTS

| 2,826,484 | 3/1958 | Buehler | 422/265 |
| 2,934,409 | 4/1960 | Biehl | 210/198.1 X |
| 3,607,103 | 9/1971 | Kiefer | 422/277 X |
| 3,792,979 | 2/1974 | Clinton | 210/198.1 X |
| 3,916,467 | 11/1975 | Curd, Jr. | 441/28 |

*Primary Examiner*—Joseph J. Rolla
*Assistant Examiner*—Laurence J. Miller
*Attorney, Agent, or Firm*—William C. Babcock

[57] ABSTRACT

A free floating chlorine controlling assembly that continuously exposes a substantial quantity of a soluble agent to the water in a spa, hot tub, or pool, which agent may be one that tends to decrease the alkalinity of the water.

3 Claims, 4 Drawing Figures

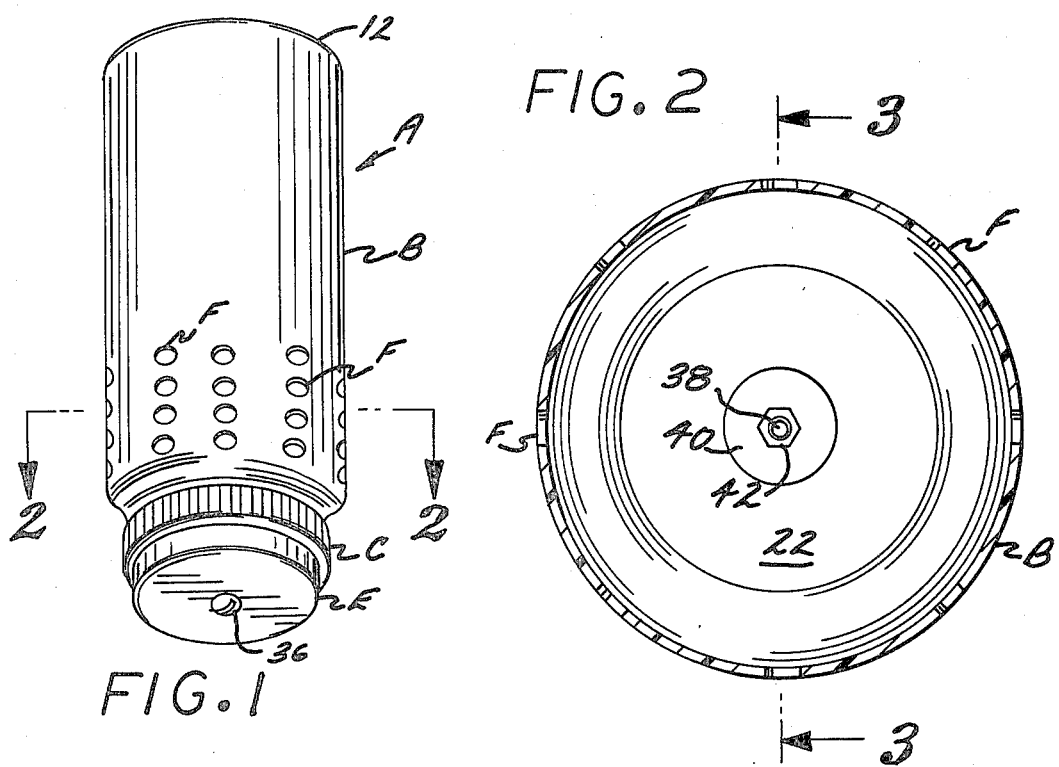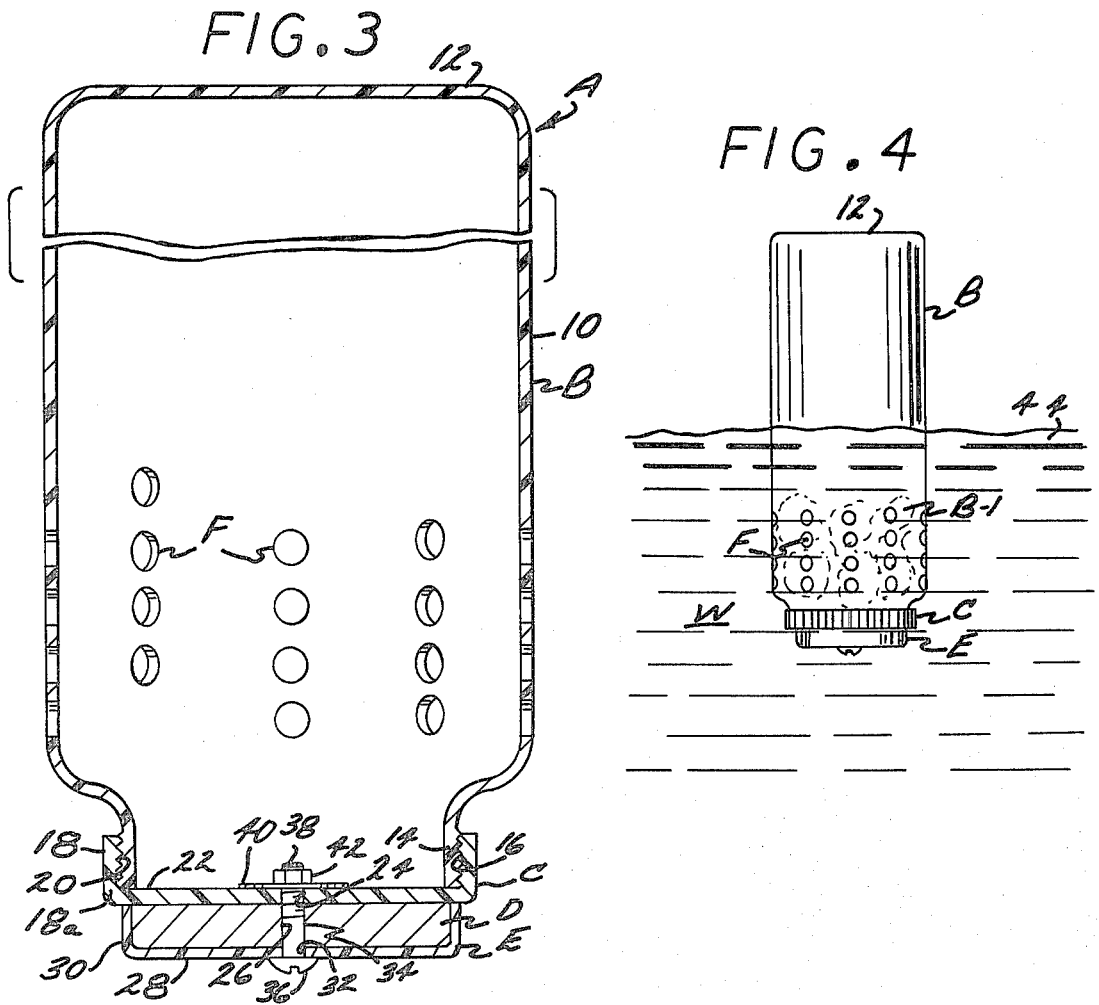

FREE FLOATING CHLORINE CONTROLLING ASSEMBLY

SUMMARY OF THE INVENTION

A cylindrical container having an open externally threaded mouth that is removably engaged by an internally threaded closure. The closure has a weight removably secured thereto. A number of transverse spaced passages are defined in the container adjacent the mouth thereof.

When the container is at least partially filled with the chlorine control agent, and dropped into a spa and pool the weight will maintain the container in an inverted free floating position, due to a quantity of air being trapped in the upper interior of the container. The trapped air adds buoyancy to the assembly.

The weight secured to the closure and the weight of the quantity of the chlorine agent in the container must be so related and adjusted that the container free floats in an inverted position in the water, with at least a portion of the container projecting above the surface of the water in which it is disposed. The transverse passages must be sufficiently close to the mouth that even when the chlorine control agent is substantially depleted, the passages will remain below the surface of the water to prevent the trapped air in the container escaping therefrom and water entering to replace the escaped air which allows the container to sink.

A major object of the present invention is to provide a dispenser for a chlorine control agent, which dispenser has a simple mechanical structure, is fabricated from standard commercially available materials, is simple and easy to use, is inexpensive, and may be used equally effectively either in a spa or pool.

These and other objects and advantages of the invention will become apparent from the following description of a preferred form thereof as hereinafter described.

BRIEF DESCRIPTION OF THE DRAWING

FIG. 1 is a perspective view of the chlorine control assembly;

FIG. 2 is a transverse cross sectional view of the assembly taken on the line 2—2 of FIG. 1;

FIG. 3 is a longitudinal cross sectional view of the unit shown in FIG. 1; and

FIG. 4 is a side elevational view of the chlorine controlling assembly floating freely in a body of water.

DESCRIPTION OF THE PREFERRED EMBODIMENT

The chlorine controlling assembly A is shown in detail in FIGS. 1 and 3, and free floating in a body of water in FIG. 4. The assembly A includes an elongate container B, preferably formed from a substantially rigid inert material such as a polymerized resin or the like, with the container including a cylindrical sidewall 10 that has a first end 12 that is closed, and a second end portion that defines a ring shaped mouth 14. The ring shaped mouth 14 has first threads 16 defined on the exterior surface thereof.

A closure C is provided that is formed with a ring shaped sidewall 18 that has second threads 20 formed on the exterior surface thereof. The sidewall 18 has a first end 18a from which a web 22 extends transversely across the ring shaped wall. The web 22 has a first centered opening 24 therein.

A circular weight D is provided that has a second centered opening 26 extending transversely therethrough. A cup shaped retainer E is provided that has a bottom 28 from which a cylindrical sidewall 30 extends upwardly. The bottom 28 has a third centered opening 32 therein.

A screw 34 is provided that has a head 36 that is situated below the third centered opening 32 and is of larger transverse cross sectional area than the third opening. A threaded shank 38 extends upwardly from the head 36 and passes through the first, second and third centered opening 24, 26 and 32. A washer 38 rests on the upper surface of the bottom 28 and has the shank 38 extending therethrough. The portion of the shank 38 above the washer is removably engaged by a nut 32 to hold the weight D in a fixed position below the closure C.

The cylindrical sidewall 10 has a number of transverse passages F formed therein in spaced relationship and located adjacent the ring shaped mouth 14.

In use, the closure C is removed from the container B and a chlorine controlling agent B-1 is either tablet or stick form disposed with the confines of the container. The closure member is now screwed on to the ring shaped mouth 14. When the device A is dropped into a body of water, the wieght D will cause the container B to free float in an inverted position, with the transverse passages being disposed below the level 44 of a body of water W.

The weight of the chlorine controlling agent B-1, and the weight D must be such that when the assembly A is free floating as shown in FIG. 4, with a portion of the container B disposed above the surface 44 of the water W. As the assembly A free floats in a random pattern in the body of water W, the water will flow through the transverse passages F and dissolve the chlorine controlling agent B-1, with the dissolved agent intermixing with the balance of the water W to either increase or decrease the chlorine thereof depending upon the chemical characteristics of the agent.

The chlorine controlling agent B-1 must be either in tablet or stick form of a size greater than that of the transverse passages F, to prevent the solid agent B-1 being inadvertantly displaced from the container B. As the chlorine controlling agent B-1 is dissolved, the weight of the invention A decreases, and the body of air G trapped in the upper portion of the container B will cause the container to rise in the water W. The height of the container B projecting upwardly from the level 44 of the water W visually indicates to the user in general the quantity of the chlorine control agent B-1 remaining in the container B.

The weight W must be so related to the weight of the chlorine control agent B-1, that even when the control agent has been substantially depleted, no one of the transverse passages F will rise above the level 44 of the water to admit the trapped air to escape from the container. If trapped air escapes from the container B, water W will of course flow through transverse passages F to replace the same, with the container B becoming filled with water and sinking to the bottom of the spa or pool, which is undesirable. By experience, the user will know when the container B has the upwardly exposed portion B rising above the surface 44 of the water to greater than a predetermined height, that the quantity of control agent B-1 has been substantially depleted and must be replaced.

Replacing of the chlorine control agent B-1 is a simple matter. The invention A is simply grasped by one hand and rotated 180° to position the mouth 14 in an upward position, with the closure C then removed. A desired quantity of the chlorine controlling agent B-1 is now placed in the container B, with the closure member C being again affixed thereto as previously described. The invention A may now be dropped into the body of water W where due to the magnitude of the weight D and the control agent B-1 the container B will immediately assume an inverted position, with a quantity of air being trapped in the upper portion thereof to add buoyancy to the invention A so that it will free flow in the body of water W.

In FIG. 3 it will be seen that the weight D may be separated from the retainer E and closure C by separating the nut 42 from the screw 34. Thus, a weight D may be selected that is of such magnitude relative to that of the chlorine control agent B-1 that the container B will have a portion projecting above the level 44 of water W when a predetermined weight of the agent is placed in container B. The magnitude of the selected weight D must be such that the passages F will not be exposed to the air when the agent B-1 is depleted.

In the drawing it will be seen that the passages F are so spaced as to spiral circumferentially and downwardly on the container B to effect a more intimate mixing of water W as it flows transversely through the container to dissolve the chlorine control agent B-1.

The use and operation of the invention has been described previously in detail and need not be repeated.

What is claimed is:

1. A free floating chlorine controlling assembly that continuously exposes a substantial quantity of a soluble agent to the water in either a spa, hot tub, or pool, which agent may be one that tends to increase the chlorine of said water, said assembly including:
    a. a polymerized resin container that is defined by a cylindrical sidewall that has a closed first end and a second end defined by a ring shaped mouth, said mouth having first threads defined thereon, and a plurality of spaced transverse passages in said container adjacent said second end;
    b. a closure defined by a ring shaped sidewall that has a first circumferential edge, a web that extends from said first circumferential edge and spans said closure, said web having a first centered opening therein;
    c. a weight of not greater transverse cross sectional area than said weight, said web having a second centered opening extending transversely therethrough;
    d. a cup shaped retainer that includes a bottom that has a cylindrical sidewall extending upwardly therefrom, said bottom having a third centered opening therein;
    e. a screw that includes a head of greater diameter than that of third opening and a threaded shank that projects from said head, said shank projecting longitudinally through said first, second and third centered openings; and
    f. a nut that removably engages said shank to hold said closure, weight and retainer together as an integral unit wherein said weight is mounted between said closure and said retainer, said weight together with the weight of said agent said container maintaining said container in an inverted free floating position when said assembly is disposed in said water, with a portion of said container projecting above the surface of said water, said assembly floating due to a body of air trapped in the upper interior of said container, and said weight of such magnitude that it maintains said container in an inverted position in said water with the uppermost ones of said passages below the surface of said water to prevent the escape of said trapped body of air after said agent has been depleted by dissolving in water that enters said container through said passages as said assembly floats in a random pattern in said water.

2. An assembly as defined in claim 1 which in addition includes:
    g. a washer engaged by said shank and interposed between said nut and web.

3. An assembly as defined in claim 1, in which said transverse passages are spaced to spiral circumferentially and downwardly towards said second end.

* * * * *